Patented May 22, 1951

2,553,721

UNITED STATES PATENT OFFICE 2,553,721

PROCESS OF PRODUCING SULFITE ESTERS

Alphonse Pechukas, Akron, Ohio, assignor to Pittsburgh Plate Glass Company, Allegheny County, Pa., a corporation of Pennsylvania No Drawing. Application August 20, 1947,
Serial No. 769,767

10 Claims. (Cl. 260—456)

This invention is concerned with the production of sulfite esters of alcohols particularly primary and secondary monohydric alcohols.

It is known that such esters may be prepared by reaction of thionyl chloride with the corresponding alcohol, the reaction apparently proceeding in accordance with the equation:

$$2ROH + SOCl_2 \rightarrow 2HCl + R_2SO_3$$

Previously, some difficulty has been encountered in the preparation of many sulfites of this character due to the fact that yields of the resulting esters are undesirably low and that an objectionable amount of chlorosulfinate or chloride of the corresponding alcohol has been formed during the preparation. With some compounds such as phenol, the presence of hydrogen chloride acceptors such as pyridine has been thought to be necessary in order to cause substantial reaction to occur.

The present invention provides a simple method whereby sulfites may be prepared by reaction of alcohols particularly primary and secondary alcohols in high yield, without the use of a hydrogen chloride acceptor such as pyridine. In accordance with this invention it has been found that sulfites may be prepared in high yield, frequently higher than prior art processes, and in a simple and economic manner by reacting a primary or secondary alcohol with thionyl chloride in liquid phase and in the presence of a liquid solvent which is a solvent for the alcohol, thionyl chloride and sulfite of the alcohol and which essentially is a nonsolvent or poor solvent for the hydrogen chloride evolved during the reaction. In this process, the temperature of the reaction mixture is maintained at the boiling temperature whereby substantial distillation takes place, and sufficient of said nonsolvent is maintained present to ensure removal of HCl substantially as soon as formed and to reduce the solubility of HCl in the reaction mixture to a low value. As a consequence hydrogen chloride which is evolved during the reaction is carried from the solution with the vaporizing nonsolvent. This vapor mixture passes through a suitable reflux condenser system for the purpose of condensing the nonsolvent and returning it to the reaction mixture. Because of insolubility of the HCl in the nonsolvent only a minor quantity or substantially none of the HCl escaping from the reaction mixture is returned with the nonsolvent to the reaction mixture.

I have found that chloride formation, previously encountered in a reaction of this character, is due, at least to a large degree, to undesirable decomposition of sulfite in substantial accordance with the equation:

$$R_2SO_3 + HCl \rightarrow RCl + ROH + SO_2$$

Furthermore I have found that HCl has substantial solubility in liquid sulfites such as are produced by reaction of thionyl chloride with alcohols. These two factors combine to promote formation of chlorides, frequently to a serious degree.

By using a nonsolvent for HCl as herein contemplated, the solubility of HCl in the reaction mixture may be maintained low. This is particularly true when the reaction mixture is maintained at a temperature such that substantial distillation takes place. In such a case the solubility of the HCl remains at a substantial minimum and is removed substantially as soon as formed due to the distillation of the nonsolvent.

In general the process is initiated by introducing a quantity of the nonsolvent into a reactor equipped with a reflux condenser system. This condenser system has a suitable outlet to permit escape of HCl gas beyond the condenser. Heat is applied to the reactor to cause reflux of the nonsolvent. Thereupon alcohol and thionyl chloride are added continuously or periodically in relative amounts required to react and form the corresponding sulfite.

During the reaction the temperature of the reaction mixture is maintained at a level at which substantial distillation of the nonsolvent occurs. The rate of such distillation should be sufficient to ensure removal of HCl substantially as fast as it is evolved.

The process is continued by adding reactants periodically or continuously and nonsolvent is returned or added to the mixture at a rate sufficient to replace that distilled off. If the process is conducted in a continuous manner, suitable means are provided for drawing off a quantity of the mixture during the operation.

Various solvents for the alcohol and the thionyl chloride which are nonsolvents for HCl may be used. Such "nonsolvents" are liquids in which the solubility of HCl at their boiling temperature is low, for example of the order of one percent by weight of HCl or below. In general nonoxygenated solvents having boiling points of 0 to 200° C. are suitable. Such solvents or "nonsolvents" should be substantially miscible with the sulfite ester or at least have a relatively high solubility (for example 10 percent or more by weight) therein.

A particularly effective class of solvents which may be used as herein contemplated, are the hydrocarbon halides. Typical chlorinated hydrocarbons which have been found to be suitable are ethyl chloride, methylene chloride, chloroform, carbon tetrachloride, trichloro-propanes, monochlorobenzene, trichlorethylene, perchloroethylene, difluoro-dichloro-methane and ortho dichlorobenzene. A further class of nonsolvents which are suitable for this purpose include liquid hydrocarbons having the boiling points desired, such as heptane, hexane, cyclohexane, benzene, xylene, gasolene or toluene. The selection of any particular nonsolvent will depend, to some degree at least, upon the boiling point of the alcohol undergoing esterification and the solubility of the alcohol in the nonsolvent, as will be readily understood by those skilled in the art. Especially effective nonsolvents for the purpose herein contemplated are methylene chloride and carbon tetrachloride.

The nonsolvent used should have a boiling point below that of the alcohol or hydroxy compound which is being esterified. However it is usually desirable for the nonsolvent to have a boiling point within 75° C. of the boiling point of the alcohol. For example, in reacting phenol with thionyl chloride better yields are obtained using monochlorobenzene than with methylene chloride or carbon tetrachloride. On the other hand the production of sulfites of the lower aliphatic alcohols containing up to 8 carbon atoms, is best accomplished using solvents which boil below 100° C.

In order to ensure production of a sulfite ester in good yield, and to avoid undue preparation of chlorosulfinates and chlorides, a proper ratio between the amount of alcohol and the amount of thionyl chloride in the reaction mixture should be maintained. If the molar ratio of alcohol group to thionyl chloride is less than 2, some chlorosulfinate may tend to be produced and in general the molar ratio of alcohol to thionyl chloride should not be below about 1.8. On the other hand, if too much alcohol is used, yields of sulfite frequently are reduced at least to some degree. In general the molar ratio of alcohol to thionyl chloride should not exceed about 5. Best yields have been obtained when the molar ratio of alcohol to thionyl chloride was approximately 2.25. With diatomic and polyatomic alcohols, these ratios change in accordance with the number of hydroxyl groups in the alcohol.

The amount of nonsolvent used should be sufficient to ensure appreciable distillation of solvent and of course appreciable reflux thereof. No hard and fast rule may be laid down in this connection since it has been found that a wide variation in the ratio of solvent to alcohol-thionyl chloride mixture may be maintained so long as substantial reflux or at least distillation of the nonsolvent from the reaction mixture takes place. Usually the amount of nonsolvent present and the rate of vaporization thereof should be sufficient to establish a partial pressure due to nonsolvent vapors which is not less than about one-half of the partial pressure of the HCl vapor and preferably the nonsolvent vapor partial pressure should be at least 75 percent of atmospheric pressure. In general, the amount of nonsolvent in the reactor should not be less than 10 percent by volume of the volume of sulfite ester which is present and for most purposes the volume of nonsolvent should be 0.5 to 5 times the volume of sulfite ester present.

The results which are obtained with any particular concentration of nonsolvent for HCl depends to a large degree upon the rate of distillation of nonsolvent from the reaction mixture. For example, in one series of tests involving reaction of thionyl chloride with methanol in the presence of methylene chloride using 5 parts by volume of methylene chloride per volume of methyl sulfite it was found possible to raise the yield about 5 percent of theoretical by increasing the rate of distillation of the methylene chloride so that the partial pressure increased from about ½ of the HCl partial pressure until the pressure due to the nonsolvent was about 75 to 90 percent of atmospheric pressure. Moreover five volumes of nonsolvent per volume of sulfite ester resulted in a yield about 5 to 10 percent greater than is obtained when but 0.5 volume of nonsolvent was used. To a substantial degree, a decreased nonsolvent to sulfite ester ratio may be compensated for by an increased rate of distillation and in like manner a decreased rate of distillation may be compensated for by an increased ratio of nonsolvent to sulfite ester.

The process is particularly concerned with the preparation of sulfite esters of monohydric alcohols which contain up to 8 carbon atoms. Thus, the invention has been found to be applicable to the production of esters of methyl alcohol, ethyl alcohol, n-propyl alcohol, isopropyl alcohol, n-butyl alcohol, isobutyl alcohol, isoamyl alcohol, octyl alcohol, cyclohexyl alcohol, methyl hexyl carbinol, benzyl alcohol, allyl alcohol, methallyl alcohol, crotyl alcohol, methyl vinyl carbinol, propargyl alcohol, benzyl alcohol, cinnamyl alcohol, beta phenyl ethyl alcohol, 2-chloroethyl alcohol, 2-cyano ethyl alcohol, 1,2-dichloropropanol and the corresponding nitro- or bromoalcohols or other similar monohydric aliphatic, cycloaliphatic or aryl alcohol. Esters of higher alcohols containing, for example, up to 30 carbon atoms such as esters of stearyl alcohol, lauryl alcohol, nonyl alcohol, oleyl alcohol, blown sperm alcohols, etc. also may be prepared. Moreover the invention may be extended to the production of sulfite esters of other compounds which contain an hydroxyl group which is esterifiable with acids such as sulfite esters of phenol, cresol, esters of hydroxy acids such as ethyl lactate, ethyl salicylate, ethyl glycollate and similar esters. Esters of polyhydroxy compounds which contain two or more esterifiable hydroxyl groups such as ethylene glycol, propylene glycol, glycerol, hydroquinone, etc. also may be prepared according to this invention.

The following examples are illustrative:

EXAMPLE I

The apparatus used consisted of a 3-liter reaction flask equipped with a mercury sealed agitator, thermometer, and a cold water reflux condenser which was provided with a Dry Ice-acetone-cooled cold finger on top of the condenser and an outlet beyond the condenser for the escape of evolved HCl from the condenser system. The flask was provided with a side arm which drained into a 2-liter 3-neck flask provided with a water cooled reflux condenser and a Dry Ice-acetone-cooled cold finger on top of the condenser. The side arm was so located as to maintain the quantity of reaction mixture in the first reaction flask at 1500 milliliters. The reactor flask was heated on a water bath and the second 3-neck flask was heated on a steam bath.

Alcohol, thionyl chloride and methylene chloride were fed into the reactor every two minutes, the methylene chloride being added first and the thionyl chloride last at a rate sufficient to supply reactants required to produce 1½ mols of product (assuming theoretical yields) per hour and to maintain a ratio of 5 parts of solvent to 1 of product by volume. In this case reagent additions each two minutes were as follows:

22.3 milliliters of methylene chloride
  4.06 milliliters of methanol
  3.65 milliliters of thionyl chloride The process was continued until 6 mols of thionyl chloride and 12 mols of methanol had been added during which the average reaction temperature remained approximately from 36 to 39° C. and the cooling water supplied to the reflux condensers was approximately 20–25° C. During this period methylene chloride refluxed in the reflux condenser over the reaction flask and evolved HCl escaped through the reflux condenser from the system. As reaction proceeded the flask filled up and overflowed through the side arm into the other flask which was maintained at the degassing temperature (approximately 43–44° C.). Upon fractionation of the product a total yield of 95.6% of dimethyl sulfite was obtained.

EXAMPLE II

Into a 5-liter 3-necked flask was placed 850 cubic centimeters of methylene chloride. The flask was fitted with a thermometer, glass stirrer, two dropping funnels and a water cooled condenser. The system was heated to the reflux temperature of methylene chloride (40° C.) and 900 grams of thionyl chloride and 1980 grams of 2-ethylhexyl alcohol was slowly added over a period of 3 hours. The rate of addition was such that at least two mols of alcohol per mol of thionyl chloride was added at all times. After addition had been completed, refluxing was continued until evolution of HCl ceased. The mixture was heated in vacuo to distill off the methylene chloride and the resulting dioctyl sulfite was obtained. This ester had an index of refraction $n_D^{20}$ of 1.4488. The yield of this ester was 91.6% of theoretical yield.

EXAMPLE III

A 5-liter flask containing 2980 cubic centimeters of methylene chloride was fitted with a bulb type water cooled reflux condenser, nickel stirrer and two dropping funnels. The flask and contents were warmed to the reflux temperature of methylene chloride (40° C.) and 595 grams of thionyl chloride and 1006 grams of ethylene chlorohydrin was slowly added over a period of 3 hours. The rates of addition were such that a small excess of ethylene chlorohydrin over the theoretical required for sulfite production was maintained. Reflux was continued for hours until HCl evolution substantially ceased. Thereafter the methylene chloride was distilled off and 2-chloroethyl sulfite obtained in 91 percent of theoretical yield.

EXAMPLE IV

The process of Example III was repeated using 1000 cc. of methylene chloride, one mol of thionyl chloride and two mols of isopropyl alcohol, the time of addition being 8 hours. The reaction mixture was allowed to stand for two additional hours and then was blown with dry air until HCl was essentially completely removed. The methylene chloride was distilled off and isopropyl sulfite in approximately 90 percent yield was obtained together with a small amount of diisopropyl ether.

The following tables describe the conditions of operation using other alcohols and/or other solvents:

*n-Propyl alcohol with thionyl chloride*

| Solvent (°C.) | Total Reaction Time (Hrs.) | Reactants (Moles) | | Products (Moles) | | |
|---|---|---|---|---|---|---|
| | | Alcohol | SOCl₂ | R₂SO₃ | ROSOCl | RCl |
| (CH₂Cl₂) | 6.5 | 2 | 1 | 0.93 | 0.0 | 0.01 |
| (CCl₄) | 6 | 2 | 1 | 0.96 | 0.0 | 0.03 |
| Monochlorobenzene | 4 | 2 | 1 | 0.89 | 0.0 | 0.10 |
| Orthodichlorobenzene | 4 | 2 | 1 | 0.78 | 0.0 | 0.20 |

*Reaction of isopropyl alcohol with thionyl chloride*

| Temperature (°C.) | Total Reaction Time (Hrs.) | Reactants (Mols) | | Products (Mols) | | | | |
|---|---|---|---|---|---|---|---|---|
| | | Alcohol | SOCl₂ | R₂SO₃ | ROSOCl | RCl | Olefin | Ether |
| 130 Monochlorobenzene | 4 | 2 | 1 | 0.44 | 0.0 | 0.17 | 0.15 | 0.08 |
| 40 (CH₂Cl₂) | 8 | 2 | 1 | 0.90 | 0.0 | 0.09 | 0.0 | |
| 180 Orthodichlorobenzene | 4 | 2 | 1 | 0.26 | 0.0 | 0.35 | 0.20 | 0.07 |

The above sulfites also may be prepared using thionyl bromide in lieu of thionyl chloride.

Although the present invention has been directed with particular reference to the specific details of certain embodiments thereof, it is not intended that such details shall be regarded as limitations upon the scope of the invention except insofar as included in the accompanying claims.

What I claim is:

1. A process of producing a sulphite by reaction of thionyl chloride with an hydroxy compound which contains an hydroxy group esterifiable by acids which comprises heating a volatile liquid which is a non-solvent for HCl but a solvent for the ester, thionyl chloride and the hydroxy compound, to cause substantial distillation of the said liquid, gradually adding the hydroxy compound and the thionyl chloride to the liquid during acid distillation whereby to produce the sulphite and maintaining the concentration and the rate of vaporization of said volatile liquid sufficiently high to establish and maintain during the addition of said hydroxy compound a partial pressure due to the vapor of said volatile liquid not less than 75% of atmospheric pressure.

2. A process of producing a sulphite by reaction of thionyl chloride with an hydroxy compound which contains an hydroxy group esterifiable by acids which comprises heating a volatile liquid which is a non-solvent for HCl but a solvent for the ester, thionyl chloride and the hydroxy compound, to cause substantial distillation of said volatile liquid, gradually adding the hydroxy compound and the thionyl chloride to the liquid during said distillation, whereby to produce the ester and maintaining the concentration of said volatile liquid at least one half of the volume of the sulphite ester present in said liquid body and maintaining the rate of vaporization sufficiently high to establish and maintain during the addition of the hydroxy compound a partial pressure due to the volatile liquid not less than 75% of atmospheric pressure.

3. A process of producing a sulphite by reaction of thionyl chloride with an hydroxy compound which contains an hydroxy group esterifiable by acids which comprises heating a volatile liquid which is a non-solvent for HCl but a solvent for the ester, thionyl chloride and the hydroxy compound, to cause substantial distillation of said volatile liquid, gradually adding the hydroxy compound and the thionyl chloride to the liquid during said distillation, whereby to produce the ester and maintaining the concentration of said volatile liquid at least five times the volume of the sulphite present in said liquid body and maintaining the rate of vaporization sufficiently high to establish and maintain during the addition of the hydroxy compound a partial pressure due to the volatile liquid not less than 75% of atmospheric pressure.

4. The process of claim 1 wherein the solvent has a boiling point lower than the alcohol.

5. The process of claim 1 wherein the boiling point of the solvent does not exceed 100° C.

6. A method of producing a sulfite ester by reaction of thionyl chloride with a hydroxy compound which contains an hydroxy group esterifiable with acids which comprises heating a body of a liquid which is a nonsolvent for HCl but a solvent for the sulfite, thionyl chloride and the hydroxy compound to cause substantial distillation thereof, adding portions of hydroxy compound and thionyl chloride in substantially stoichiometric proportions required to produce the sulfite, and adding sufficient nonsolvent to the mixture to ensure substantially continuous distillation thereof during the addition of the thionyl chloride and hydroxy compound, and maintaining the rate of vaporization of the non-solvent sufficiently high to establish a partial pressure, due to non-solvent vapor, not less than 75 percent of atmospheric pressure.

7. The process of claim 1 wherein the non-solvent is a normally liquid hydrocarbon halide.

8. The process of claim 1 wherein the non-solvent is a normally liquid hydrocarbon.

9. The process of claim 6 wherein the non-solvent is a normally liquid hydrocarbon halide.

10. The process of claim 6 wherein the non-solvent is a normally liquid hydrocarbon.

ALPHONSE PECHUKAS.

REFERENCES CITED

The following references are of record in the file of this patent:

UNITED STATES PATENTS

| Number | Name | Date |
|---|---|---|
| 1,766,720 | Nicolai | June 24, 1930 |
| 1,944,274 | Salzberg | Jan. 23, 1934 |
| 2,005,619 | Graves | June 18, 1935 |
| 2,177,757 | Vanderbilt | Oct. 31, 1939 |
| 2,309,829 | Davis et al. | Feb. 2, 1943 |
| 2,409,039 | Hardy et al. | Oct. 8, 1946 |
| 2,471,274 | Lingo | May 24, 1949 |

FOREIGN PATENTS

| Number | Country | Date |
|---|---|---|
| 487,253 | Germany | Dec. 12, 1929 |

OTHER REFERENCES

Houben: "Die Methoden der Org. Chemie" (3rd ed., pub. in U. S. 1943), vol. 2, pp. 665–666.

"Richter's Organic Chemistry" (Allott), 3rd ed., 1934, vol. I, page 160.